United States Patent Office 3,705,007
Patented Dec. 5, 1972

3,705,007
PROCESS FOR THE PREPARATION OF AMMONIUM BIFLUORIDE FROM AMMONIUM FLUORIDE
Bernard M. Lichstein, Elizabeth, and Cyril Woolf, Morristown, N.J., assignors to Allied Chemical Corporation, New York, N.Y.
No Drawing. Filed Aug. 25, 1970, Ser. No. 66,906
Int. Cl. C01c 1/16; C01b 9/08
U.S. Cl. 423—471
5 Claims

ABSTRACT OF THE DISCLOSURE

Aqueous solutions of ammonium fluoride can be transformed into a substantially anhydrous mixture containing at least 90% ammonium bifluoride and correspondingly 10% or less of ammonium fluoride by distilling off a portion of the aqueous component of the solution at a pot temperature ranging up to about 150° C. until said solution contains from 5 to 30% water based on the original weight of ammonium fluoride, and then continuing heating the solution until at least about 90% of the nonaqueous solution component is ammonium bifluoride, with sufficient water being added to replace that lost during said continued heating so as to maintain the water content of the solution at from about 5% to about 30% and then rendering the mixture substantially anhydrous by removing the residual water at a temperature ranging from about 50° C. up to 130° C. at a pressure of less than about 700 mm. of mercury.

BACKGROUND OF THE INVENTION

This invention relates to a process for the transformation of aqueous solutions of ammonium fluoride into ammonium bifluoride, having a very low water content. Ammonium bifluoride is a useful commercial product containing 66% fluorine. It is easily shipped as a solid, or, because of its low melting point, as a melt. It readily yields hydrogen fluoride on reaction with strong acids, e.g., hydrochloric acid or sulfuric acid. It etches glass and attacks minerals to form fluorides. It can react with various inorganic nonfluorine halides to give the corresponding fluorides.

Ammonium bifluoride is substantially more useful commercially than ammonium fluoride and hence, extensive efforts have been directed to developing an efficient process for transforming ammonium fluoride, and in particular, comparatively dilute aqueous solutions of ammonium fluoride, into substantially water free ammonium bifluoride. It has been known for over 50 years that the conversion of ammonium fluoride to ammonium bifluoride can be effected by heating ammonium fluoride in accordance with the equation

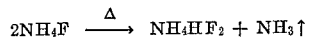

Since ammonium fluoride is ordinarily obtained as a by-product in aqueous solution, the evaporative concentration of such solution is ordinarily simultaneously accompanied by the thermal conversion to ammonium bifluoride.

To those unskilled in the art, it would appear that it would only be necessary to take an aqueous solution of ammonium fluoride, distill off the water and the ammonia formed by the simultaneous transformation of $NH_4F$ into $NH_4HF_2$, and then heat the substantially anhydrous residue to drive off any remaining ammonia, thereby affording anhydrous ammonium bifluoride.

Unfortunately, this is not the case. Heating an aqueous solution of ammonium fluoride to above 100° C. will result in the simultaneous evolution of water and ammonia indicating transformation of the $NH_4F$ into $NH_4HF_2$. However, the dehydration and transformation will not go to completion. By heating to a temperature above 100° C., the unreacted ammonium fluoride and the ammonium bifluoride which has been formed will be retained in solution by progressively lesser quantities of constituent water, and there will eventually be obtained at a pot temperature of about 175° C. a salt mixture comprising about 70% $NH_4HF_2$ and correspondingly about 30% $NH_4F$ and also from 5 to 10 weight percent water based on the combined weight of $NH_4F$ and $NH_4HF_2$. This last 5 to 10 weight percent water is held very tenaciously and can only be removed by heating the mixture above 200° C. This heating above 200° C. will also effect transformation of a small percentage of the remaining $NH_4F$ into $NH_4HF_2$. Unfortunately, at temperatures above 150° C. $NH_4HF_2$ and $NH_4F$ sublime, thereby resulting in the formation of a gaseous mixture of $NH_3$, HF, $NH_4F$, $H_2O$, and $NH_4HF_2$. Complete transformation of $NH_4F$ to $NH_4HF_2$ is therefore never achieved. Also, the $NH_4HF_2$ and HF vapors formed are highly corrosive and hence damaging to process equipment.

The net results of all these simultaneous occurrences is that simply heating an aqueous solution of ammonium fluoride will never afford good yields of substantially water free ammonium bifluoride.

To avoid the aforementioned difficulties, the prior art has offered numerous solutions. For example, U.S. Pat. 3,005,684 teaches concentrating an aqueous ammonium fluoride solution by heating the same at a temperature above 150° C. so as to distill off the water and interrupting the concentration as soon as a control sample shows a distinctly acid odor when cooled; and, as an additional step, breaking up the solidifying melt into small pieces while the solidification thereof, on cooling, progresses so as to increase the solidification velocity and drive off additional water by the effect of the released heat of solidification. This technique is said to afford ammonium bifluoride of about 75% purity which may then be recrystallized to afford ammonium bifluoride of still higher purity. As is apparent, this process requires both physical comminution of the partially solidified crude salt and subsequent recrystallization thereof to obtain substantially pure ammonium bifluoride. Additionally, the monofluoride present in the crude salt must be either discarded or the crystallization mother liquor recycled.

U.S. Pat. 3,106,449 describes an elaborate cyclic process for converting an aqueous ammonium fluoride solution into crystalline ammonium bifluoride which comprises:

(1) Evaporating a solution of ammonium fluoride and ammonium bifluoride at a concentration in the range of 44 to 50 weight percent fluoride and a salt mol fraction of 0.47 to 0.60 at a constant temperature in the range of 125 to 135° C. in an evaporating vessel to remove ammonia and water, (2) Continuously removing a portion of the concentrated solution and separating pure crystalline ammonium bifluoride crystals by cooling to a temperature of about 25° C., (3) Continuously recycling the mother liquor from the crystallization to the evaporating vessel, (4) Continuously adding the ammonium fluoride solution to be converted to the evaporating solution at the rate necessary to maintain a constant evaporating temperature, and finally (5) Drying and recovering pure ammonium bifluoride crystals as a product.

As is apparent, this process requires very careful control of process parameters and utilizes a starting solution having a very precisely limited composition range.

U.S. Patent 3,212,849 discloses the carrying out of the evaporation of the ammonium fluoride solution at subatmospheric pressure. However, this process still fails to achieve really high conversion rates to the anhydrous bifluoride.

U.S. Patent 3,310,369 discloses a process comprising dehydrating ammonium fluoride at a temperature of 130° C. to 230° C., passing the gases evolved through a reaction zone maintained at a temperature of 100° C. to 140° C., reacting in said reaction zone volatilized hydrogen fluoride and ammonia obtained during the dehydration of the ammonium fluoride to form ammonium bifluoride, exhausting from said reaction zone water and excess ammonia, returning the ammonium bifluoride produced in the reaction zone to the ammonium fluoride being dehydrated, continuing the process until substantial removal of water from the ammonium flouride starting material has been effected and recovering the ammonium bifluoride produced.

Finally, French Patent 723,983 teaches a process comprising microevaporating ammonium fluoride containing 2 to 36% by weight water to afford dry ammonium bifluoride.

Clearly, all of these prior art processes require complex processing steps or are applicable only to a limited range of starting materials of a very restricted type, or both.

SUMMARY OF THE INVENTION

It is an object of this invention to provide a facile process for the transformation of aqueous solutions of ammonium fluoride into substantially water free ammonium bifluoride. It is a further object of this invention to achieve such transformation by a relatively simple process and in high yield.

Further objects and advantages will become apparent from the description of the invention which follows in greater detail.

It has now been found in accordance with the instant invention that if an aqueous solution of ammonium fluoride is heated to evaporate off the water and simultaneously convert the fluoride to bifluoride; and the water vapor and ammonia which are concomitantly formed by such heating removed, the "pot temperature," i.e. the temperature to which it is required to heat the solution in order to evolve water vapor therefrom, will gradually rise to about 150° C. at which point there remains a solution containing about 5 weight percent water based on the original weight of ammonium fluoride. Aqueous solutions of 70 to 90% ammonium fluoride will boil at pot temperatures of about 115° C. to 145° C.

The transformation of ammonium fluoride to ammonium bifluoride becomes significant at about 100° C., however, the higher pot temperature achieved with more concentrated solutions (no more than 30% water) provide a more rapid conversion of fluoride to bifluoride. The more concentrated solutions also provide a more complete conversion. To maintain the pot temperature at or below 150° C., at least about 5% water based on the original weight of ammonium fluoride must be allowed to remain in the solution. Between about 5 to 30% water based on the original weight of ammonium fluoride must be present in the solution to achieve high conversions in accordance with the instant invention.

Several points should be carefully noted at this juncture. If an aqueous ammonium fluoride solution is heated without reflux up to a pot temperature of about 150° C., the nonaqueous component of the remaining solution will contain no more than about 50 weight percent ammonium bifluoride. If heating is continued without reflux so as to distill off the retained water, the pot temperature of the solution will rapidly rise above 150° C. and further limited conversion will occur. However, concurrently, unchanged ammonium fluoride and already formed ammonium bifluoride will sublime and also decompose.

Thus, although an ammonium fluoride/ammonium bifluoride aqueous salt solution can be rendered substantially anhydrous by heating at temperatures well above 150° C., such heating will not produce ammonium bifluoride uncontaminated with substantial amounts of ammonium fluoride. Additionally, significant amounts of already formed ammonium bifluoride and unchanged ammonium fluoride will be lost through sublimation and decomposition. The prior art frequently refers to this loss as loss of "fluorine values." If the solution comprising ammonium bifluoride/ammonium fluoride nonaqueous component and 5% or more water is simply heated at total reflux, the pot temperature will remain approximately the same and there will be no additional transformation of ammonium fluoride into ammonium bifluoride and ammonia.

We have unexpectedly found, however, that if the ammonium bifluoride/ammonium fluoride mixture in solution with about 5 to 30% water, based on the original weight of ammonium fluoride, which solution is ordinarily obtained by evaporation of a more dilute ammonium fluoride solution, is further evaporated, but make-up water added to the solution of ammonium bifluoride/ammonium fluoride so as to maintain the solution water content at from about 5 to 30 weight percent based on the weight of ammonium fluoride in the original solution, then several highly desirable effects will be achieved.

(1) The pot temperature will not rise above 150° C. so that substantially no sublimation or decomposition of ammonium bifluoride will occur, and, (2) Of particular significance, a major portion of the remaining ammonium fluoride in the solution will be transformed into the desired ammonium bifluoride plus ammonia.

Thus, by our novel process of keeping the water concentration at about 5 to 30 weight percent, the solution containing a mixture of ammonium bifluoride/ammonium fluoride with substantial amounts of ammonium fluoride being present can be transformed into a solution, the nonaqueous component of which contains at least 90 weight percent ammonium bifluoride and correspondingly less than 10 weight percent ammonium fluoride (hereinafter 90/10 mixture), without loss of fluorine values by sublimation or decomposition of the already formed ammonium bifluoride.

The critical concentration and temperature factors to be borne in mind are as follows:

(1) At a pot temperature of about 100° C., a limited, although perceptible transformation of ammonium fluoride into bifluoride occurs. The transformation becomes extensive however slightly above 100° C.

(2) The pot temperature at the boiling point of a dilute aqueous solution of ammonium fluoride is rather surprisingly slightly below 100° C. It is only when the solution becomes fairly concentrated, i.e. less than about 30 weight percent water, that the pot temperature of the solution rises substantially above 100° C.

(3) The higher the temperature at which the solution is refluxed within the range of above 100° C. up to about 150° C., the more rapid the transformation of fluoride to bifluoride plus ammonia.

(4) An aqueous solution containing less than about 5 weight percent water will have a pot temperature of greater than about 150° C.

(5) Concentrated solutions of ammonium fluoride containing only about 5 to 30% water permit significantly more complete conversion of fluoride to bifluoride plus ammonia than do more dilute solutions.

Thus, to practice the process of the instant invention, an aqueous solution of ammonium fluoride is first concentrated by removal of a portion of the aqueous component thereof until it contains 5 to 30 weight percent water based on the original weight of ammonium fluoride. Preferably, of course, the solution will be evaporated until the pot temperature rises to about 150° C., i.e. the solution contains about 5 weight percent water to 15 weight percent.

The aqueous solution of ammonium fluoride can, of course, be obtained by dissolving dry ammonium fluoride in water to provide a solution containing at least about 5% water. In practice, however, many industrial processes such as phosphoric acid manufacture afford dilute aqueous solutions of ammonium fluoride, and our process is particularly applicable to recovering ammonium bifluoride from such solutions. If the initial aqueous solution of ammonium fluoride also contains some ammonium bifluoride as well, this is of course not in any way harmful to our process. Essentially any aqueous solution of ammonium fluoride containing more than about 5.0 weight percent water can be utilized in the process of the instant invention and after evaporation of a sufficient amount of the water present to provide a solution containing 5 to 30 weight percent water, the solution can then be transformed into a 90/10 mixture by continued heating with water return as hereinbefore described. The exact pot temperature after evaporation to a water content of 5 to 30 weight percent will be influenced by the initial water content of the solution and the rate of evaporation, but will in all instances be no greater than 150° C.

The evaporating is preferably effected at atmospheric pressure, or at subatmospheric pressures which are not so low as to result in too low a pot temperature, i.e. the pot temperature must be above 100° C. to effect the transformation of fluoride into bifluoride to the extent desired. Evaporation at superatmospheric pressure is undesirable since it reduces the extent of transformation because the solubility of ammonia in the reaction solution is increased, thereby tending to shift the equilibrium to the fluoride side of the equation.

The transformation into the 90/10 mixture can be ascertained simply by following the ammonia evolution which accompanies said transformation. When the evolution of ammonia ceases or decreases appreciably in rate, the transformation is substantially complete.

The addition of the make-up water during said transformation can be effected by any of the known conventional means for adding liquids to reaction vessels wherein the vessel contents are maintained at a temperature greater than the boiling point of the added liquid. We have found that the most convenient method of addition entails pumping the make-up water through a tube placed near the bottom of the vessel containing the salt solution below the surface of said solution. Alternatively, the addition of new make-up water to maintain the water concentration at 5 to 30 weight percent can be avoided by the use of a stripping still or similar apparatus in which the ammonia is stripped out of the distillant and the water component thereof returned to the reaction vessel.

After the 90/10 mixture has been obtained, it will of course still contain substantial water (generally about 5 to 30 weight percent water). The mixture can be rendered substantially anhydrous without loss of fluorine values either by conventional recrystallization or preferably by stripping off the remaining water at subatmospheric pressure. It is singularly surprising to find that this final 5 to 30% water can be removed by stripping the 90/10 mixture at reduced pressure since one would expect that the ammonium bifluoride would cosublime. However, we have unexpectedly found this not to be the case.

Thus, by mild continued heating of the reaction vessel containing the 90/10 mixture at 50° to 130° C., preferably at 100° to 120° C., while maintaining the pressure in the vessel at less than about 700 mm. of Hg, preferably 10–300 mm. of Hg, and removing the thereby evolved water, the 90/10 mixture can be rendered substantially anhydrous and thereafter removed from the reaction vessel. Of course, the 90/10 mixture can first be removed from the initial evaporation vessel and then rendered anhydrous subsequently by heating at reduced pressure as above described, if desired. By "substantially" anhydrous is meant that the 90/10 mixture will contain less than 2.0 weight percent water, and generally even less. Some small additional conversion of fluoride to bifluoride may occur at this stage.

The invention can be more fully understood by reference to the following examples. All parts are parts by weight unless otherwise expressly noted.

Example 1

Ammonium fluoride, 305 g. (anhydrous weight) was dissolved in sufficient distilled water to afford a 19.8 weight percent solution. The solution was put in a monel flask fitted with a one foot Vigreaux column. The top of the column was fitted with a water cooled take off. The pot temperature was determined with a thermocouple inserted in a monel thermowell. Heat was applied by means of an oil bath. The pot was heated up to 138° C. with stirring at which point sufficient water had been distilled off to afford an 85.2 weight percent solution based on the original charge of ammonium fluoride. The head temperature varied from 96.5° to 99.5°.

The water/ammonia distillate was caught in hydrochloric acid and weighed. The ammonia content was determined by titration and the weight of ammonia was subtracted from the total weight of the distillate to determine the water content of the distillate. At this point, 66.4% of the theoretical amount of ammonia had been distilled off.

The distillation was then continued while water was added to maintain the water concentration at approximately the level previously attained. After a total of 340 g. water had been added (and at the same time, an equal amount had been distilled out), the ammonia evolved had reached 89.4% of theory. The pot temperature varied from 131° to 138° during this stage of the process.

The reactor pot was then fitted to a rotating evaporator and the contents thereof dried at about 120° at 90–92 mm. The ammonia evolved in the drying step brought the conversion to 90.3% of theory. The dried product was removed from the reactor and ground to give a white, free flowing, nonhygroscopic powder which was determined by wet analysis to contain 91.3% ammonium bifluoride and 0.68% water.

The weight balance was 94.1% of the amount expected from the above analysis. All distillate fractions were analyzed for fluoride ion. The loss in this manner of fluorine as fluoride ion was only 0.1% of the total charged.

Example 2

Ammonium fluoride, 73.6 g. was mixed with sufficient distilled water to give an 88.2 weight percent solution. The apparatus was essentially the same as that described in Example 1 except that the Vigreaux column was replaced with a simple water cooled take-off. The reaction mixture was heated at a pot temperature of about 130° for four hours. During this time, 180 g. of water was added and an equal amount removed. The amount of ammonia removed was 83.4% of theoretical. The pot contents were then stripped at 100° at 10 mm. pressure. At this point, the amount of ammonia removed was 86.4% of theory. The product analyzed for 93.6% $NH_4HF_2$, 6% $NH_4F$ and 0.4% $H_2O$. This example shows that by our technique even very concentrated solutions of ammonium fluoride can be readily transformed into substantially anhydrous ammonium bifluoride. As used in the instant examples, the reference to evolved ammonia as a percent of theoretical of course connotes that percentage of the ammonia which would be evolved if 100% conversion of fluoride to bifluoride had been achieved.

Example 3

Ammonium fluoride, 73.6 g., was mixed with sufficient distilled water to give a 19.9% solution. The apparatus was the same as that utilized in Example 2. The mixture was heated over a 2.5 hour period up to a pot temperature of 175° until no more distillate evolved at this temperature. The ammonia evolved was 80.3% of theoretical. The pot contents were then dried at 100° at 15 mm. It analyzed for 82.1% $NH_4HF_2$, 16.1% $NH_4F$ and 1.8% $H_2O$. This indicates that even by using substantially higher pot temperatures, which are of course accompanied by loss of fluorine values, a lower degree of conversion of fluoride to bifluoride is achieved if the water return procedure of the instant invention is not utilized.

Example 4

Ammonium fluoride, 148 g., was dissolved in enough distilled water to give an 80% solution. This solution was charged to monel reaction flask fitted with a 2 foot water-cooled dephlegmator type stripping still packed with stainless steel Penn State type packing. The flask contents were heated at a temperature of from 105° to 120° at a pressure of 470 mm. for 4.5 hours, with water being added to replace any which stripped off. The flask contents were then dried at 120° and 100 mm. pressure affording material which analyzed as 91.4% $NH_4HF_2$, 8.3% $NH_4F$ and 0.3% $H_2O$. The weight balance was within 90.2% of that given by the analysis. This indicates that our process can be carried out at reduced pressure provided the pressure is not so low as to reduce the pot temperature below about 100° C.

Example 5

Ammonium fluoride, 89.1 g., was dissolved in water to make an 18.9% solution. The mixture was heated up to 145° over a 2.5 hour period to remove sufficient water to give a 91% solution. The heating was then continued while 221 g. water was added to the reactor and distilled off at the same time. The product was then dried at 120° C. and 100 mm. to give a product which analyzed for 97.0% $NH_4HF_2$, 2.7% $NH_4F$ and 0.3% $H_2O$. The weight balance was 94%.

We claim:
1. A process for the preparation of a substantially anhydrous mixture comprising at least about 90 weight percent ammonium bifluoride and correspondingly no greater than about 10 weight percent ammonium fluoride, comprising the steps of
   (a) heating an aqueous solution of ammonium fluoride with concomitant removal of the thereby evolved water vapor and ammonia until said solution contains from about 5 to 30 weight percent water based on the original weight of ammonium fluoride.
   (b) heating said solution at a temperature no greater than about 150° C. with concomitant removal of the thereby evolved ammonia while maintaining the water content of said solution at from about 5 to 30 weight percent until the nonaqueous component of said solution comprises at least about 90 weight percent ammonium bifluoride and correspondingly, no greater than about 10 weight percent ammonium fluoride.
   (c) heating said solution at a temperature ranging from about 50° C. to 130° C. at a pressure of less than about 700 mm. of mercury with concomitant removal of the thereby evolved water vapor.

2. A process in accordance with claim 1 wherein said water content of the solution in step (b) is maintained at from about 5 to 15 weight percent.

3. A process in accordance with claim 1 wherein said heating in step (a) is effected at atmospheric pressure.

4. A process in accordance with claim 1 wherein said maintaining of the water content of the solution in step (b) is achieved by returning the aqueous component of the distillant resulting from said heating to said solution.

5. A process in accordance with claim 1 wherein said heating in step (c) is at a temperature of about 100° to 120° C. and a pressure of 10 to 300 mm. of mercury.

References Cited

UNITED STATES PATENTS

| | | | |
|---|---|---|---|
| 3,005,684 | 10/1961 | Hans-Joachim Riedl et al. | 23—88 |
| 3,106,449 | 10/1963 | Fitch | 23—88 |

OSCAR R. VERTIZ, Primary Examiner

G. A. HELLER, Assistant Examiner

U.S. Cl. X.R.

423—489